(12) United States Patent
Hasegawa

(10) Patent No.: US 10,829,178 B2
(45) Date of Patent: Nov. 10, 2020

(54) VEHICLE BODY FRAME OF STRADDLE-TYPE VEHICLE

(71) Applicant: SUZUKI MOTOR CORPORATION, Hamamatsu (JP)

(72) Inventor: Kei Hasegawa, Hamamatsu (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 177 days.

(21) Appl. No.: 16/043,724

(22) Filed: Jul. 24, 2018

(65) Prior Publication Data
US 2019/0047654 A1   Feb. 14, 2019

(30) Foreign Application Priority Data

Aug. 10, 2017 (JP) .................. 2017-156073

(51) Int. Cl.
| | |
|---|---|
| *B62K 11/04* | (2006.01) |
| *B62K 25/28* | (2006.01) |
| *B62K 19/20* | (2006.01) |
| *B62K 19/12* | (2006.01) |
| *B62K 19/06* | (2006.01) |
| *B62K 25/26* | (2006.01) |

(52) U.S. Cl.
CPC ............. *B62K 11/04* (2013.01); *B62K 19/06* (2013.01); *B62K 19/12* (2013.01); *B62K 19/20* (2013.01); *B62K 25/283* (2013.01); *B62K 25/286* (2013.01); *B62K 25/26* (2013.01)

(58) Field of Classification Search
CPC .................................................. B62K 11/04
See application file for complete search history.

(56) References Cited

U.S. PATENT DOCUMENTS

| | | | | |
|---|---|---|---|---|
| 8,602,152 | B2 * | 12/2013 | Kashiwai ............... | B62K 11/02 |
| | | | | 180/300 |
| 8,657,321 | B2 * | 2/2014 | Kashiwai ............... | B62K 11/04 |
| | | | | 180/228 |
| 9,308,966 | B2 * | 4/2016 | Kosuge ................. | H02J 7/0022 |
| 9,908,581 | B2 * | 3/2018 | Tada ....................... | B62K 11/04 |
| 10,167,054 | B2 * | 1/2019 | Kawata .................... | B62M 7/04 |
| 2019/0202521 | A1 * | 7/2019 | Yamamoto ............. | B62K 19/40 |
| 2020/0070924 | A1 * | 3/2020 | Sawasaki ............... | B62K 19/32 |

FOREIGN PATENT DOCUMENTS

JP          S 61-215186 A       9/1986

* cited by examiner

*Primary Examiner* — Kevin Hurley
(74) *Attorney, Agent, or Firm* — Stein IP, LLC

(57) ABSTRACT

There is provided a vehicle body frame of a straddle-type vehicle. A tank rail extends rearward from a head pipe at an upper side of a power unit. A body frame has a pair of side frame parts extending downward from a rear end side of the tank rail, an upper coupling part couples upper parts of the side frame parts, and a lower coupling part couples lower parts of the pair of side frame parts. Front and rear mount parts support the power unit. Swing arm support parts are provided in the side frame parts. A link member connecting part connects a link member configured to couple the swing arm and a rear cushion each other. The rear mount part is formed at a front part of the lower coupling part, and the link member connecting part is formed at a rear part of the lower coupling part.

3 Claims, 9 Drawing Sheets

VEHICLE BODY FRAME OF STRADDLE-TYPE VEHICLE

CROSS-REFERENCE TO RELATED APPLICATIONS

The disclosure of Japanese Patent Application No. 2017-156073 filed on Aug. 10, 2017, including specification, drawings and claims is incorporated herein by reference in its entirety.

TECHNICAL FIELD

The present disclosure relates to a vehicle body frame of a straddle-type vehicle.

BACKGROUND

Recently, in most of straddle-type vehicles such as a motorcycle, a structure (a mono shock) configured to support a swing arm to a vehicle body frame by using a single rear cushion has been adopted. In this structure, in most cases, the rear cushion and the swing arm are coupled to each other via a link member. By coupling the rear cushion and the swing arm each other via the link member, it is possible to adjust a stroke amount of the rear cushion relative to a stroke amount of a rear wheel shaft.

In general, the link member has three connection points. A first connection point is connected to an end portion of the rear cushion, and a second connection point is connected to the swing arm. A third connection point is connected to a lower side of a part, to which a pivot of the swing arm is connected, of the vehicle body frame.

Patent Document 1 discloses a structure configured to support a rear arm 10 to a pair of brackets 5, 5 welded to rear end portions of a pair of main pipes 4, 4 by using a single hydraulic snubber 14. In this structure, the hydraulic snubber 14 and the rear arm 10 are coupled to each other via a link mechanism 15. The link mechanism 15 has a relay arm 17 and a pair of relay arms 19, 19. A front end portion of the relay arm 17 is pivotally supported to a cross tube 9b configured to couple lower end portions of the pair of brackets 5, 5, via a bracket 16. Also, rear end portions of the pair of relay arms 19, 19 are pivotally supported to a lower surface of a front end portion of the rear arm 10. Also, a rear end portion of the relay arm 17 and front end portions of the pair of relay arms 19, 19 are rotatably coupled to each other, and a lower end portion 14b of the hydraulic snubber 14 is coupled to the coupled part. In the meantime, Patent Document 1 discloses a motorcycle to which the above structure is applied, and an engine 8 of the motorcycle is mounted between the main pipes 4, 4 and a down tube 7.

Patent Document 1: Japanese Patent Application Publication No. S61-215186 A

In the structure of Patent Document 1 in which the hydraulic snubber 14 and the rear arm 10 are coupled to each other via the link mechanism 15, as shown in FIG. 2 of Patent Document 1, the bracket 16 to which the relay arm 17 is pivotally supported is supported to only an axially intermediate part of the cross tube 9b. For this reason, load transmitted to the bracket 16 via the relay arm 17 is intensively applied to the axially intermediate part of the cross tube 9b. Accordingly, the cross tube 9b may be bent by the load applied to the cross tube 9b via the relay arm 17 and the bracket 16. In this structure, the load that is vertically applied to the rear arm 10 is not accurately transmitted to the hydraulic snubber 14 via the link mechanism 15, so that the performance of the hydraulic snubber 14 may not be exhibited as designed.

SUMMARY

It is therefore one of objects of the present disclosure to provide a vehicle body frame of a straddle-type vehicle capable of increasing stiffness of a structure for supporting a link member configured to couple a rear cushion and a swing arm each other to the vehicle body frame and accurately transmitting load applied to the swing arm to the rear cushion.

According to an aspect of the embodiments of the present disclosure, there is provided a vehicle body frame of a straddle-type vehicle, comprising: a head pipe provided at a front upper side of a power unit; a tank rail extending rearward from the head pipe at an upper side of the power unit; a body frame having a pair of side frame parts extending downward from a rear end side of the tank rail at left and right rear sides of the power unit, an upper coupling part configured to couple upper parts of the pair of side frame parts, and a lower coupling part configured to couple lower parts of the pair of side frame parts; a front mount part coupled to a front end side of the tank rail or the head pipe directly or via a coupling member, and configured to support a front part of the power unit; a rear mount part configured to support a rear part of the power unit; swing arm support parts provided in the pair of side frame parts, respectively, and configured to support a front end portion of a swing arm; and a link member connecting part for connecting a link member configured to couple the swing arm and a rear cushion each other, wherein the rear mount part is formed at a front part of the lower coupling part, and the link member connecting part is formed at a rear part of the lower coupling part.

According to the present disclosure, it is possible to increase the stiffness of the structure for supporting the link member configured to couple the rear cushion and the swing arm each other to the vehicle body frame and to accurately transmit load applied to the swing arm to the rear cushion.

DETAILED DESCRIPTION OF THE EMBODIMENTS

Figure 1:
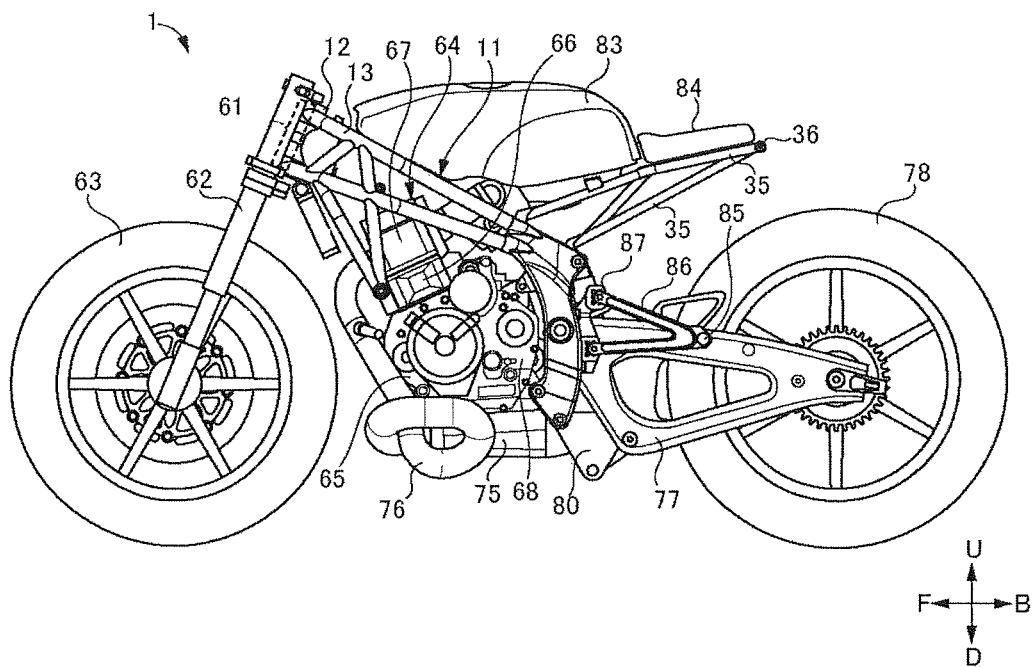
FIG. 1 depicts an outward appearance of a straddle-type vehicle having a vehicle body frame of an illustrative embodiment of the present disclosure, as seen from the left.

A vehicle body frame of an illustrative embodiment of the present disclosure has a head pipe, a tank rail, a body frame, a front mount part, a rear mount part, a swing arm support part and a link member connecting part.

The head pipe is provided at a front upper side of a power unit. The tank rail extends rearward from the head pipe at an upper side of the power unit.

The body frame has a pair of side frame parts, an upper coupling part and a lower coupling part. The pair of side frame parts extends downward from a rear end side of the tank rail at left and right rear sides of the power unit. The upper coupling part is configured to couple upper parts of the pair of side frame parts each other. The lower coupling part is configured to couple lower parts of the pair of side frame parts each other.

The front mount part has a function of supporting a front part of the power unit, and is coupled to a front end side of the tank rail or the head pipe directly or via a coupling member. In the meantime, the coupling member is a down frame or the like extending downward from the head pipe or the front end side of the tank rail, for example.

The swing arm support part has a function of supporting a front end portion of the swing arm, and is provided in each of the pair of side frame parts of the body frame.

The rear mount part has a function of supporting a rear part of the power unit, and is formed at a front part of the lower coupling part.

The link member connecting part has a function of connecting a link member configured to couple the swing arm and a rear cushion, and is formed at a rear part of the lower coupling part.

In the vehicle body frame of the illustrative embodiment of the present disclosure, the front part of the power unit is connected to a front part of the vehicle body frame, i.e., the front end side of the tank rail or the head pipe via the front mount part (or the front mount part and the coupling member). Also, the rear part of the power unit is connected to a front part of the lower coupling part of the body frame via the rear mount part. Also, the link member is connected to the rear part of the lower coupling part of the body frame.

According to the above structure, since the rear part of the power unit and the link member are respectively connected to the front part and rear part of the lower coupling part, which is a single member, it is possible to smoothly transmit load applied to the link member to the rear part of the power unit via the lower coupling part. Also, it is possible to smoothly transmit the load transmitted to the rear part of the power unit to the front part of the vehicle body frame via the power unit. Thereby, it is possible to receive the load applied to the link member by the lower coupling part, the power unit and the front part of the vehicle body frame. That is, it is possible to disperse the load applied to the link member to the lower coupling part, the power unit and the front part of the vehicle body frame, so that it is possible to suppress the load applied to the link member from being concentrated on the lower coupling part.

In this way, according to the vehicle body frame of the illustrative embodiment of the present disclosure, it is possible to form the structure for supporting the link member to the vehicle body frame by a structure in which the lower coupling part, the power unit and the front part of the vehicle body frame are integrated, so that it is possible to increaser the stiffness of the structure for supporting the link member to the vehicle body frame. Therefore, it is possible to accurately transmit the load applied to the swing arm to the rear cushion.

Illustrative Embodiments (Straddle-Type Vehicle)

Figure 2:
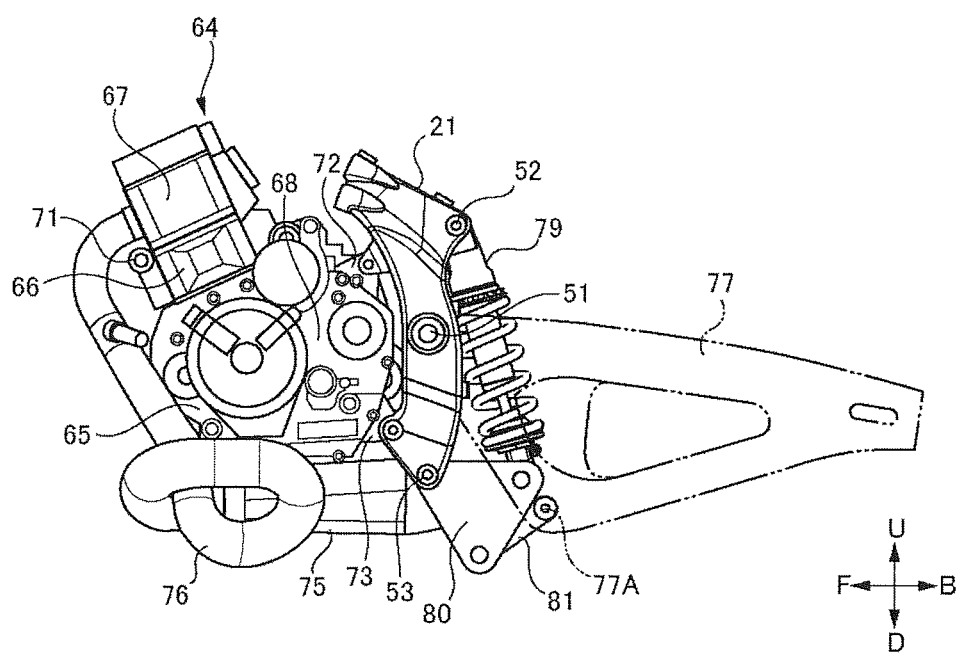
FIG. 2 illustrates a power unit, a rear cushion, a link member and the like of the straddle-type vehicle in FIG. 1.

FIG. 1 depicts an outward appearance of a straddle-type vehicle 1 having a vehicle body frame 11 of an illustrative embodiment of the present disclosure, as seen from the left. FIG. 2 illustrates a power unit 64, a rear cushion 79, a link member 80 and the like of the straddle-type vehicle 1. Meanwhile, in the illustrative embodiment to be described later, arrangements, shapes and the like of components and members are described on the basis of a driver of the straddle-type vehicle 1. The arrows shown in the right lower parts of the respective drawings indicate front (F), back (B), left (L), right (R), up (U) and down (D) directions on the basis of the driver of the straddle-type vehicle 1.

In FIG. 1, the straddle-type vehicle 1 is a motorcycle, for example. The straddle-type vehicle 1 has a vehicle body frame 11 forming a frame of the vehicle. A steering shaft 61 is supported to a front part of the vehicle body frame 11, front forks 62 are supported to the steering shaft 61 via a bracket, and a front wheel 63 is supported to the front forks 62.

Also, the power unit 64 including an engine, a transmission and the like is supported to a substantially central part of the vehicle body frame 11 in a front and rear direction. The power unit 64 has a crankcase 65, a cylinder 66 and a cylinder head 67. Also, a rear part of the crankcase 65 is integrally formed with a transmission case 68. Also, a muffler 75 is provided below the power unit 64. Also, an exhaust port provided at a front part of the cylinder head 67 and the muffler 75 are interconnected by an exhaust pipe 76.

Also, a front end portion of a swing arm 77 is supported to a lower side of a rear part of the vehicle body frame 11, and a rear wheel 78 is supported to a rear end side of the swing arm 77. Also, as shown in FIG. 2, the swing arm 77 is supported to the vehicle body frame 11 by a rear cushion 79. As described later, an upper end portion of the rear cushion 79 is connected to a rear cushion connecting part 52 provided at an upper part of a body frame 21. A lower end portion of the rear cushion 79 is connected to a front lower part of the swing arm 77 via a link member 80 and a connection member 81. Also, a front part of the link member 80 is connected to a link member connecting part 53 provided at a lower part of the body frame 21.

Also, as shown in FIG. 1, a fuel tank 83 is provided above the vehicle body frame 11, and a driver seat 84 is provided at the rear of the fuel tank 83. Also, a pair of left and right steps 85 on which driver's feet are to be put is provided below the driver seat 84, and each step 85 is mounted to the vehicle body frame 11 via a stay 86 and a stay mounting member 87.

(Vehicle Body Frame)

Figure 3:
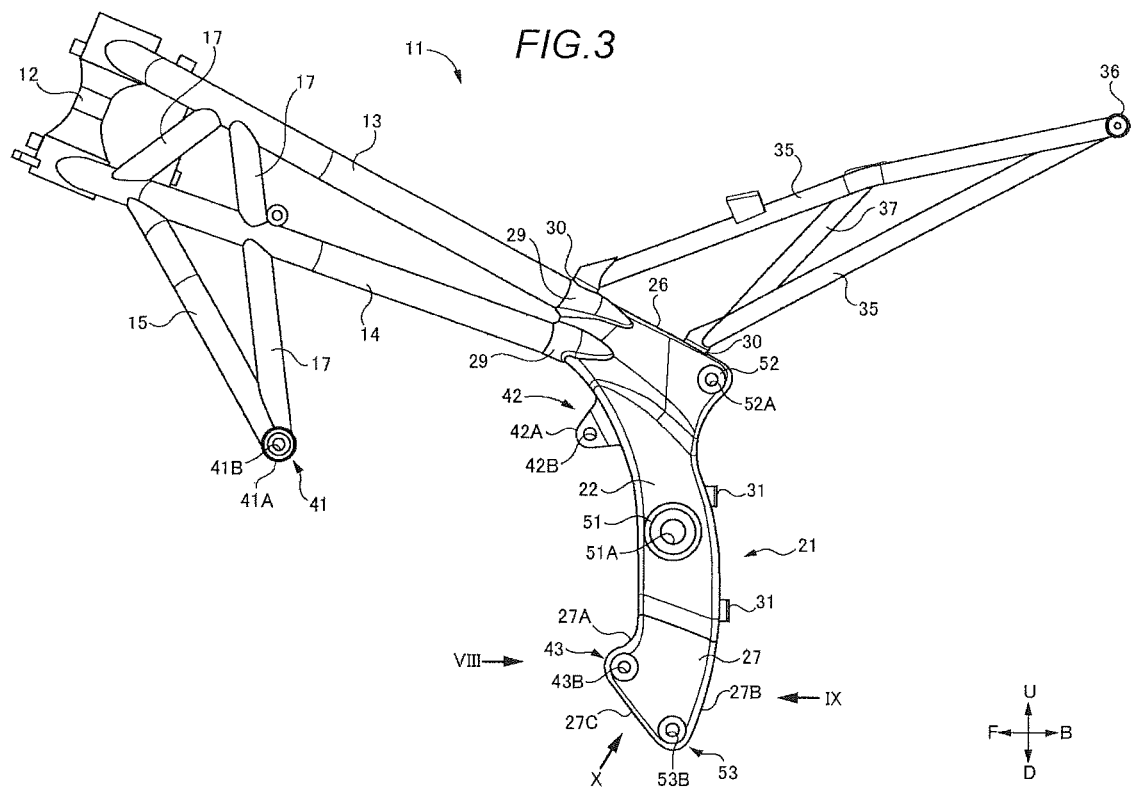
FIG. 3 depicts an outward appearance of the vehicle body frame of the illustrative embodiment of the present disclosure, as seen from the left.
Figure 4:
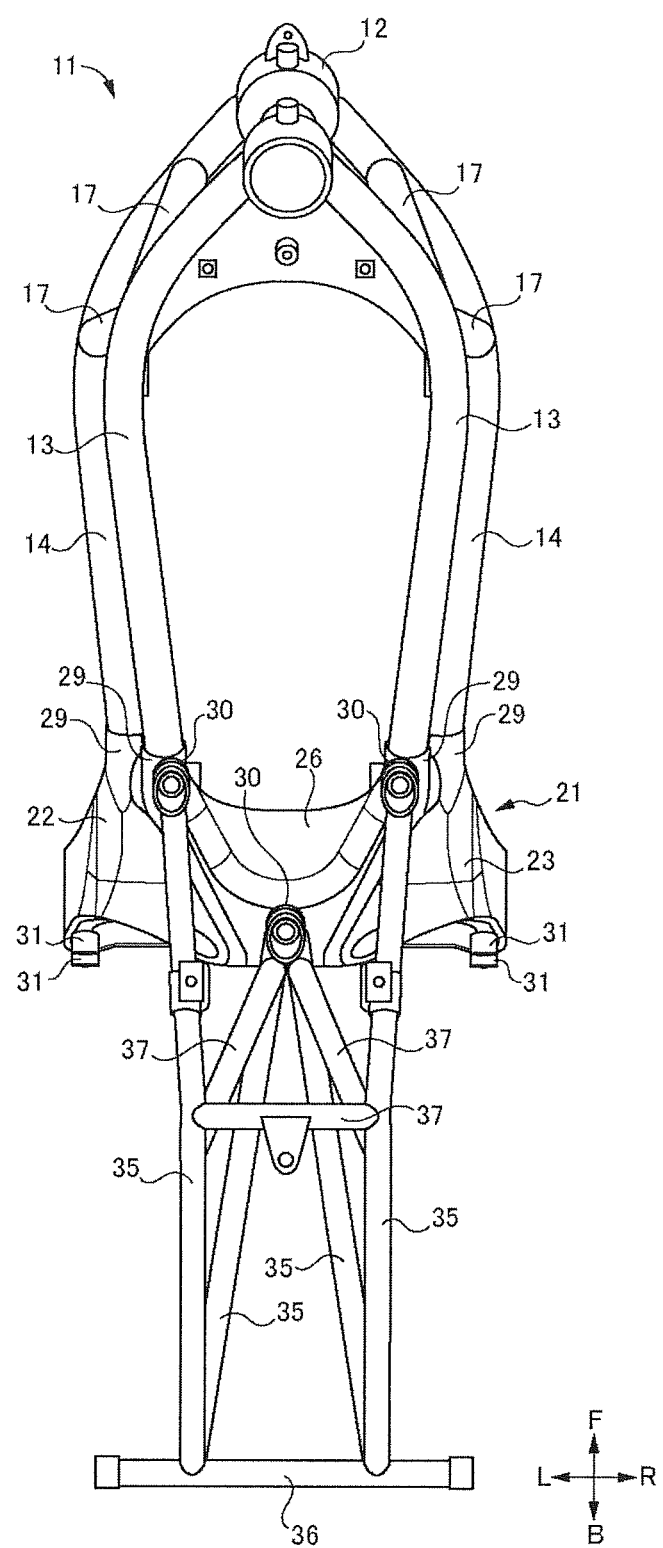
FIG. 4 depicts an outward appearance of the vehicle body frame of the illustrative embodiment of the present disclosure, as seen from above.
Figure 5:
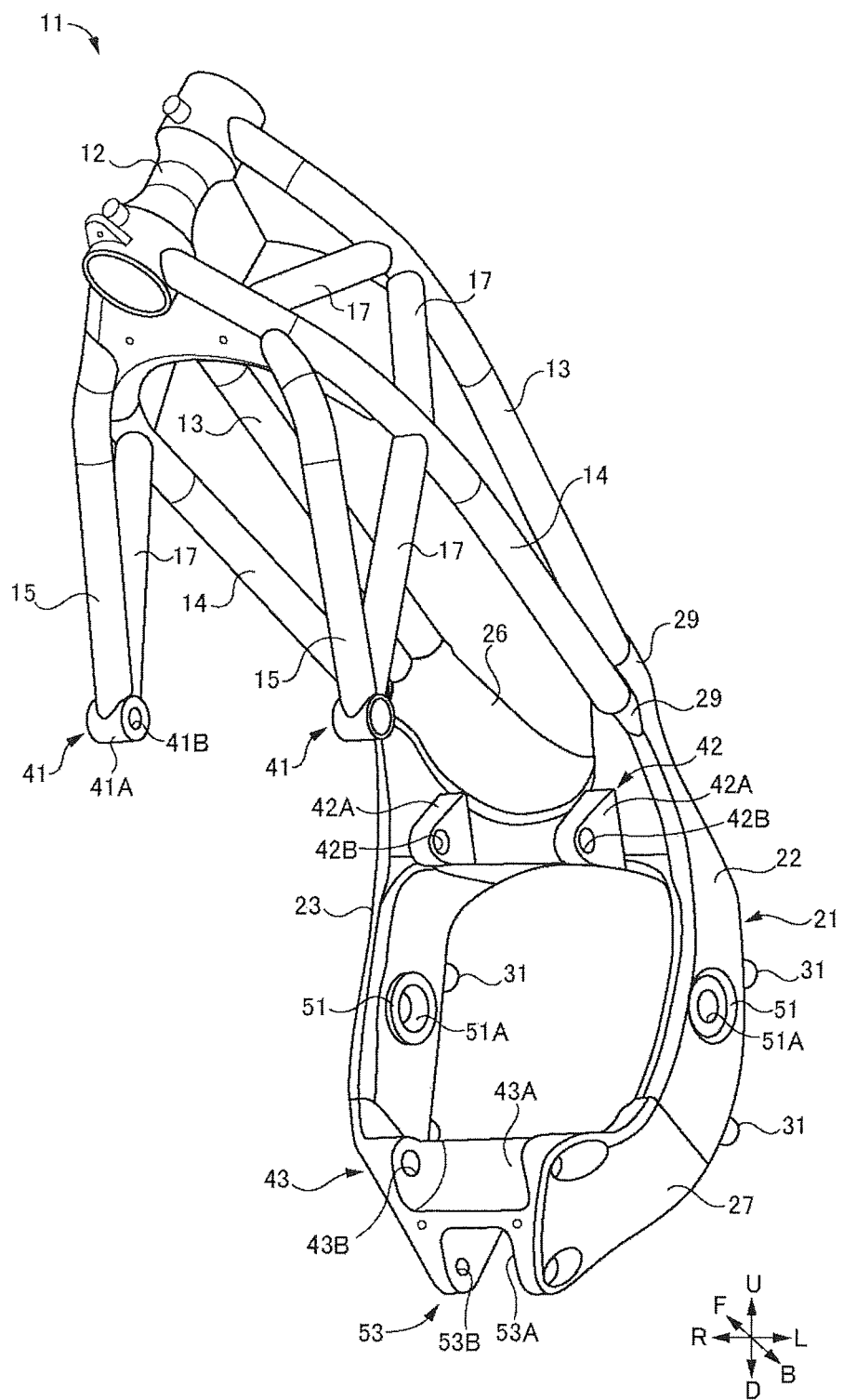
FIG. 5 depicts an outward appearance of the vehicle body frame (except a seat frame and the like) of the illustrative embodiment of the present disclosure, as seen from a left lower side of the front.
Figure 6:
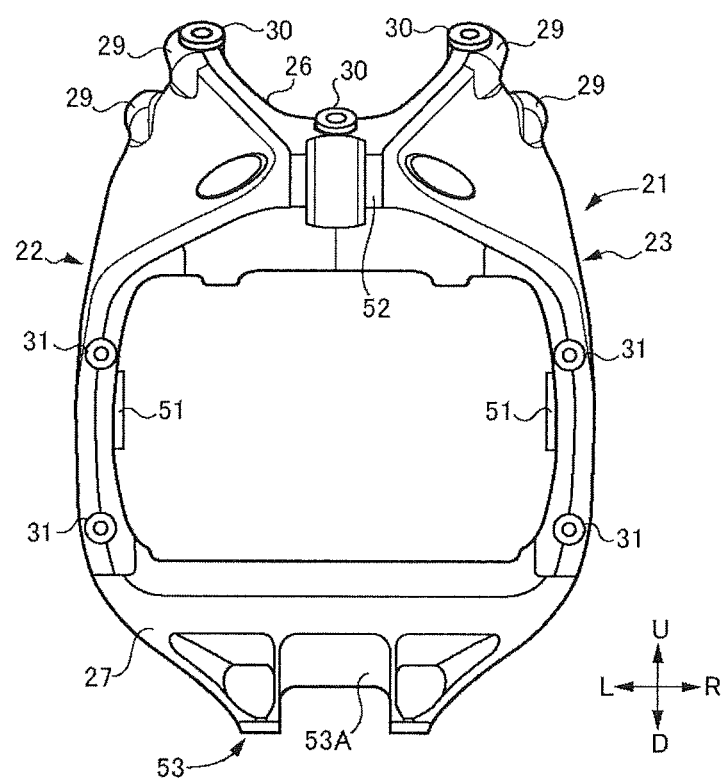
FIG. 6 depicts an outward appearance of a body frame of the vehicle body frame of the illustrative embodiment of the present disclosure, as seen from the rear.
Figure 7:
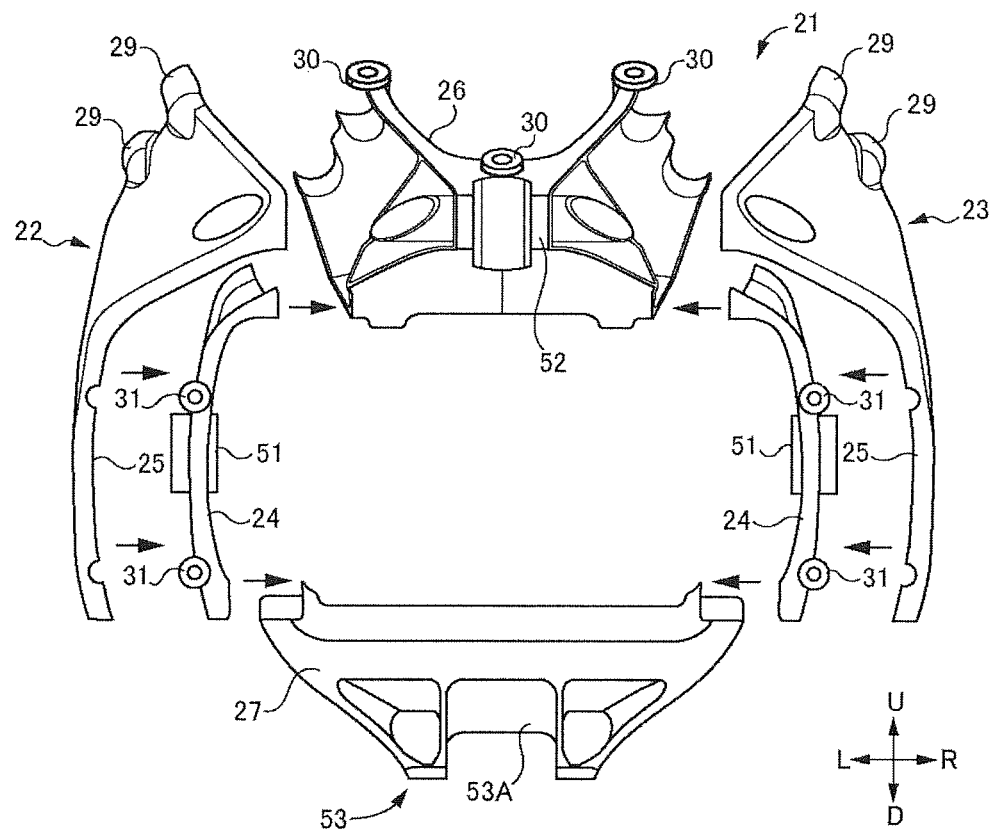
FIG. 7 is an exploded view of the body frame of the vehicle body frame of the illustrative embodiment of the present disclosure.

FIG. 3 depicts the vehicle body frame 11, as seen from the left, FIG. 4 depicts the vehicle body frame 11, as seen from above, and FIG. 5 depicts the vehicle body frame 11, as seen from a left lower side of the front. In the meantime, a seat frame 35 and the like are not shown in FIG. 5. Also, FIG. 6 depicts the body frame 21, as seen from the rear, and FIG. 7 is an exploded view of the body frame 21.

As shown in FIGS. 3 and 4, the vehicle body frame 11 has a head pipe 12, a pair of upper tank rails 13, a pair of lower tank rails 14, a pair of down frames 15, a plurality of reinforcement frames 17, the body frame 21, a plurality of seat frames 35, a bridge frame 36 and a plurality of reinforcement seat frames 37. Also, as shown in FIG. 5, the vehicle body frame 11 has a pair of front mount parts 41, a rear upper mount part 42 and a rear lower mount part 43 for supporting the power unit 64. Also, as shown in FIG. 3, the vehicle body frame 11 has swing arm support parts 51 configured to support a front end portion of the swing arm 77, a rear cushion connecting part 52 configured to connect the upper end portion of the rear cushion 79, and a link member connecting part 53 configured to connect the front part of the link member 80.

The head pipe 12 is a tube-shaped member made of metal such as iron steel, for example, and is arranged at a front upper part of the straddle-type vehicle 1, i.e., at a front upper side of the power unit 64, as shown in FIG. 1. In the head pipe 12, the steering shaft 61 is rotatably supported.

Each upper tank rail 13, each lower tank rail 14, each down frame 15 and each reinforcement frame 17 are pipes made of metal such as iron steel, for example. The pair of upper tank rails 13 is connected at front end portions thereof to an upper part of the head pipe 12, and rear end sides thereof extend rearward with being inclined downward at left and right upper sides of the power unit 64. Also, as shown in FIG. 4, the pair of upper tank rails 13 expands largely in a right and left direction as the upper tank rails extend rearward, although the front end portions thereof are close to each other. Thereafter, as can be seen from comparison of FIGS. 1 and 4, the pair of upper tank rails 13 gradually comes close to each other as the upper tank rails extend rearward beyond the cylinder head 67 of the power unit 64, as seen from above.

The pair of lower tank rails 14 is arranged below the pair of upper tank rails 13. The pair of lower tank rails 14 is connected at front end portions to a lower part of the head pipe 12, and rear end sides thereof extend rearward with being inclined downward at the left and right upper sides of the power unit 64. Also, as shown in FIG. 4, the pair of lower tank rails 14 extends rearward along a locus similar to the pair of upper tank rails 13, and passes a more outer side than the pair of upper tank rails 13.

As shown in FIG. 5, the pair of down frames 15 is connected at front end portions to the front end sides of the pair of lower tank rails 14, and rear end sides thereof extend downward with being slightly inclined rearward. Also, a lower end portion of each down frame 15 is provided with the front mount part 41 for supporting a front part of the power unit 64.

The reinforcement frames 17 are respectively provided between the upper tank rail 13 and the lower tank rail 14, between a part of the lower tank rail 14, which is located at the rear of a part to which an upper end portion of the down frame 15 is connected, and the lower end portion of the down frame 15, and the like.

The body frame 21 is a frame having functions of supporting a rear end portion of each upper tank rail 13 and a rear end portion of each lower tank rail 14, supporting each seat frame 35, supporting a rear part of the power unit 64, supporting a front end portion of the swing arm 77, supporting the rear cushion 79, and the like. As shown in FIG. 1, the body frame 21 is arranged at the rear of the power unit 64.

As shown in FIG. 6, the body frame 21 has a left frame part 22, a right frame part 23, an upper coupling part 26 and a lower coupling part 27. The left frame part 22 extends downward from the rear end portions of the left upper tank rail 13 and the left lower tank rail 14 at a left rear side of the power unit 64. The right frame part 23 extends downward from the rear end portions of the right upper tank rail 13 and the right lower tank rail 14 at a right rear side of the power unit 64. The upper coupling part 26 is configured to connect upper parts of the left frame part 22 and the right frame part 23. The lower coupling part 27 is configured to connect lower parts of the left frame part 22 and the right frame part 23.

As shown in FIG. 7, the left frame part 22 is formed by joining an inner plate part 24 and an outer plate part 25 each other. That is, the inner plate part 24 and the outer plate part 25 are respectively formed by press working a metal plate. A front edge portion and a rear edge portion of the inner plate part 24 are respectively bent to protrude leftward. Also, a front edge portion and a rear edge portion of the outer plate part 25 are respectively bent to protrude rightward. The left frame part 22 is formed by combining the front and rear edge portions of the inner plate part 24 and the front and rear edge portions of the outer plate part 25, welding the front edge portion of the inner plate part 24 and the front edge portion of the outer plate part 25 each other, and welding the rear edge portion of the inner plate part 24 and the rear edge portion of the outer plate part 25 each other. In the meantime, the right frame part 23 has a structure, which is bilaterally symmetric to the left frame part 22, and is formed by joining the inner plate part 24 and the outer plate part 25 each other in the similar method to the left frame part 22. In the meantime, the upper coupling part 26 and the lower coupling part 27 are respectively formed of metal such as iron, aluminum or the like, and are made by casting, for example. Upper end portions of the left frame part 22 and the right frame part 23 are joined to a left part and a right part of the upper coupling part 26 by welding, for example. Also, lower end portions of the left frame part 22 and the right frame part 23 are joined to a left part and a right part of the lower coupling part 27 by welding, for example.

Also, as shown in FIG. 3, a front side of a left upper part of the body frame 21 is formed with two tank rail connecting parts 29. The upper tank rail connecting part 29 of the tank rail connecting parts 29 is connected with a rear end portion of the left upper tank rail 13, and the lower tank rail connecting part 29 is connected with a rear end portion of the left lower tank rail 14. Also, as shown in FIG. 4, a front side of a right upper part of the body frame 21 is formed with two tank rail connecting parts 29. The upper tank rail connecting part 29 of the tank rail connecting parts 29 is connected with the rear end portion of the right upper tank rail 13 and the lower tank rail connecting part 29 is connected with the rear end portion of the right lower tank rail 14.

Also, as shown in FIG. 7, the two left tank rail connecting parts 29 are formed at parts at which the outer plate part 25 and the upper coupling part 26 of the left frame part 22 are combined with each other. The rear end portions of the left upper tank rail 13 and lower tank rail 14 are respectively welded to the upper coupling part 26 and the outer plate part 25. Similarly, the two right tank rail connecting parts 29 are formed at parts at which the outer plate part 25 and the upper coupling part 26 of the right frame part 23 are combined with each other, and the rear end portions of the right upper tank rail 13 and lower tank rail 14 are respectively welded to the upper coupling part 26 and the outer plate part 25.

Also, as shown in FIG. 6, an upper surface of the body frame 21, specifically, an upper surface of the upper coupling part 26 is formed with three seat frame connecting parts 30 for connecting the plurality of seat frames 35 to the body frame 21. Also, each seat frame connecting part 30 is formed with a bolt hole having threads formed on an inner peripheral surface thereof.

As shown in FIG. 4, the vehicle body frame 11 has the four seat frames 35. A front end portion of one seat frame 35 is connected to the left front seat frame connecting part 30 by bolt fastening, for example, and a front end portion of another one seat frame 35 is connected to the right front seat frame connecting part 30 by bolt fastening, for example. Also, front end portions of the two remaining seat frames 35 are connected to the rear seat frame connecting part 30 by bolt fastening, for example. Also, a rear end side of each seat frame 35 extends rearward with being inclined upward from the upper surface of the body frame 21. Also, the bridge frame 36 is connected to a rear end portion of each seat frame 35. Also, the reinforcement seat frames 37 are connected between the respective seat frames 35. Each seat frame 35, the bridge frame 36 and each reinforcement seat frame 37 are pipes made of metal such as iron steel, for example.

Also, as shown in FIG. 6, stay fixing members 31 are respectively fixed to upper and lower parts of a rear surface of the left frame part 22 of the body frame 21. As shown in FIG. 1, the stay fixing members 31 are mounted with the step 85 and the stay mounting member 87 for supporting the stay 86 at the left side of the straddle-type vehicle 1. Similarly, stay fixing members 31 are respectively fixed to upper and lower parts of a rear surface of the right frame part 23. The stay fixing members 31 are mounted with the step 85 and the stay mounting member 87 for supporting the stay 86 at the right side of the straddle-type vehicle 1.

In the meantime, as shown in FIG. 5, the pair of front mount parts 41 configured to support the front part of the power unit 64 is respectively provided at lower end portions of the pair of down frames 15. Each front mount part 41 has a mount member 41A made of a metal material and having a circular cylinder shape. Also, the mount member 41A is formed with an insertion hole 41B penetrating axially the mount member 41A. The mount member 41A is arranged so that the axial direction thereof is the right and left direction of the straddle-type vehicle 1, and a part of a circumferential surface of the mount member 41A is fixed to the lower end portion of the down frame 15 by welding, for example.

As shown in FIG. 2, left and right surfaces of the front part of the power unit 64, for example, the front of the cylinder 66 or the cylinder head 67 are respectively formed with a mounting surface 71, each mounting surface 71 is formed with a fastening hole, and an inner peripheral surface of the fastening hole is formed with threads. The left front mount part 41 and the front part of the power unit 64 are connected by arranging the front mount part 41 and the power unit 64 so that a right end face of the front mount part 41 and the left mounting surface 71 of the front part of the power unit 64 are to be contacted each other, inserting a shaft part of a mount bolt into the insertion hole 41B of the front mount part 41 from the left of the front mount part 41, and fastening the shaft part of the mount bolt into the fastening hole formed in the left mounting surface 71 of the front part of the power unit 64. Similarly, the right front mount part 41 and the front part of the power unit 64 are connected by arranging the front mount part 41 and the power unit 64 so that a left end face of the front mount part 41 and the right mounting surface 71 of the front part of the power unit 64 are to be contacted each other, inserting a shaft part of a mount bolt into the insertion hole 41B of the front mount part 41 from the right of the front mount part 41, and fastening the shaft part of the mount bolt into the fastening hole formed in the right mounting surface 71 of the front part of the power unit 64.

As shown in FIG. 5, the rear upper mount part 42 is provided at a front part of the upper coupling part 26 of the body frame 21. The rear upper mount part 42 is formed integrally with the upper coupling part 26 by casting, for example. The rear upper mount part 42 has a pair of bracket parts 42A. The bracket parts 42A respectively protrude forward from a left side and a right side of a front face of the upper coupling part 26. Also, each bracket part 42A is formed with an insertion hole 42B penetrating the bracket part 42A in the right and left direction.

As shown in FIG. 2, an upper side of a rear part of the power unit 64, specifically, an upper side of a rear part of the transmission case 68 is provided with a mounting part 72 protruding rearward and upward, and the mounting part 72 is formed with a through-hole penetrating the mounting part 72 in the right and left direction. The rear upper mount part 42 and the upper side of the rear part of the power unit 64 are connected to each other by arranging the mounting part 72 between the bracket parts 42A, inserting the shaft part of the mount bolt into the insertion hole 42B formed in the left bracket part 42A, the through-hole formed in the mounting part 72, and the insertion hole 42B formed in the right bracket part 42A, and fastening a nut to a leading end-side of the shaft part of the mount bolt.

As shown in FIG. 5, the rear lower mount part 43 is provided at a front part of the lower coupling part 27 of the body frame 21. The rear lower mount part 43 is connected with the mounting part 73 (refer to FIG. 2) provided at a lower side of the rear part of the power unit 64. The rear lower mount part 43 will be described later.

In the meantime, as shown in FIGS. 3 and 6, the swing arm support part 51 is respectively provided at a substantially intermediate portion of the left frame part 22 of the body frame 21 in the vertical direction and at a substantially intermediate portion of the right frame part 23 in the vertical direction. Each swing arm support part 51 is formed with an insertion hole 51A penetrating the swing arm support part 51 in the right and left direction.

A front end portion of the swing arm 77 is rotatably supported between the swing arm support parts 51. Specifically, the respective swing arm support parts 51 and the front end portion of the swing arm 77 are connected by arranging the front end portion of the swing arm 77 between the left and right swing arm support parts 51, inserting a pivot shaft into the insertion hole 51A formed in the left swing arm support part 51, the through-hole formed in the front end portion of the swing arm 77 and the insertion hole 51A formed in the right swing arm support part 51, and fastening both end portions of the pivot shaft to the left and the right swing arm support parts 51 by using nuts or the like.

The rear cushion connecting part 52 is provided at a rear part of the upper coupling part 26 of the body frame 21. As shown in FIG. 2, the upper end portion of the rear cushion 79 is rotatably connected to the rear cushion connecting part 52. Specifically, a central portion of the rear part of the upper coupling part 26 in the right and left direction is formed with a concave part, and bracket-shaped portions of both right and left sides of the concave part are formed with insertion holes 52A (refer to FIG. 3) penetrating the bracket-shaped portions in the right and left direction. The upper end portion of the rear cushion 79 is connected to the rear cushion connecting part 52 by inserting a bolt into each insertion hole 52A and the through-hole formed in the upper end portion of the rear cushion 79, and fastening the bolt with nuts.

The link member connecting part 53 is provided at a rear part of the lower coupling part 27 of the body frame 21. The front part of the link member 80 is rotatably connected to the link member connecting part 53. The link member connecting part 53 will be described later.

Also, as shown in FIG. 2, the link member 80 has a triangular plate shape, and connection points are respectively formed at three apex portions. The lower end portion of the rear cushion 79 is rotatably connected to the rear upper connection point of the link member 80. A front end portion of the connection member 81 is rotatably connected to the lower connection point, and a rear end portion of the connection member 81 is rotatably connected to a mounting part 77A provided at a front lower part of the swing arm 77. The front connection point is rotatably connected to the link member connecting part 53.

(Rear Lower Mount Part/Link Member Connecting Part)

Figure 8:
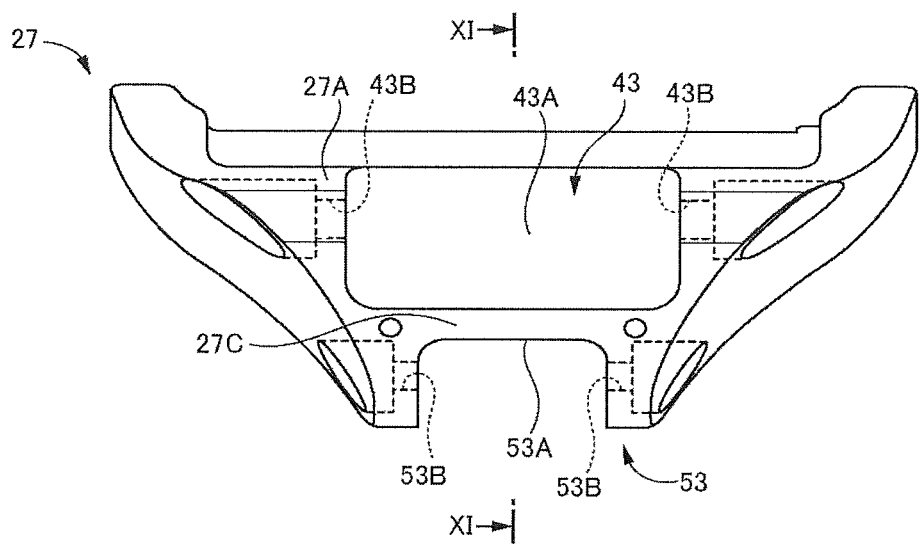
FIG. 8 depicts an outward appearance of a lower coupling part of the body frame of the vehicle body frame of the illustrative embodiment of the present disclosure, as seen from an arrow VIII direction of FIG. 3.
Figure 9:
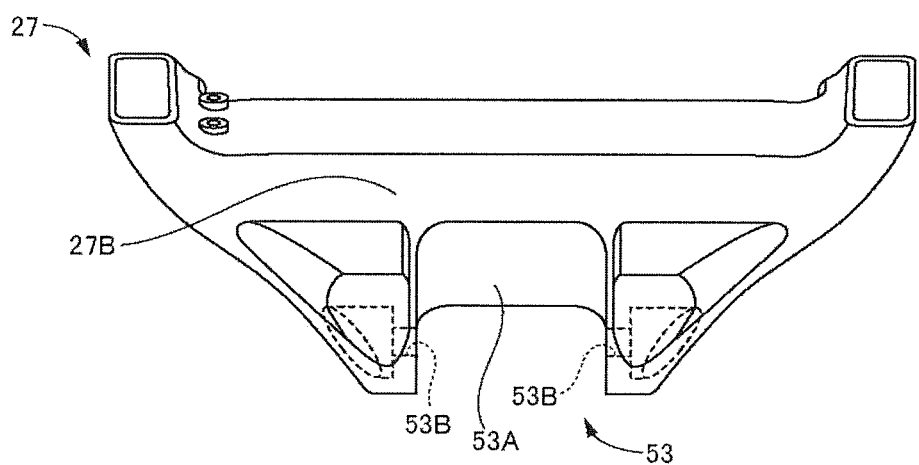
FIG. 9 depicts an outward appearance of the lower coupling part of the body frame of the vehicle body frame of the illustrative embodiment of the present disclosure, as seen from an arrow IX direction of FIG. 3.
Figure 10:
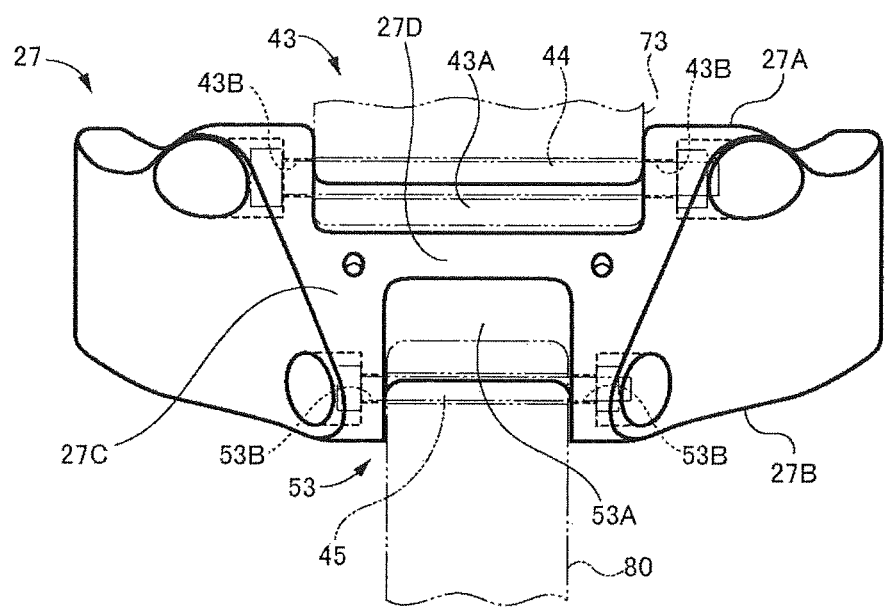
FIG. 10 depicts an outward appearance of the lower coupling part of the body frame of the vehicle body frame of the illustrative embodiment of the present disclosure, as seen from an arrow X direction of FIG. 3.
Figure 11:
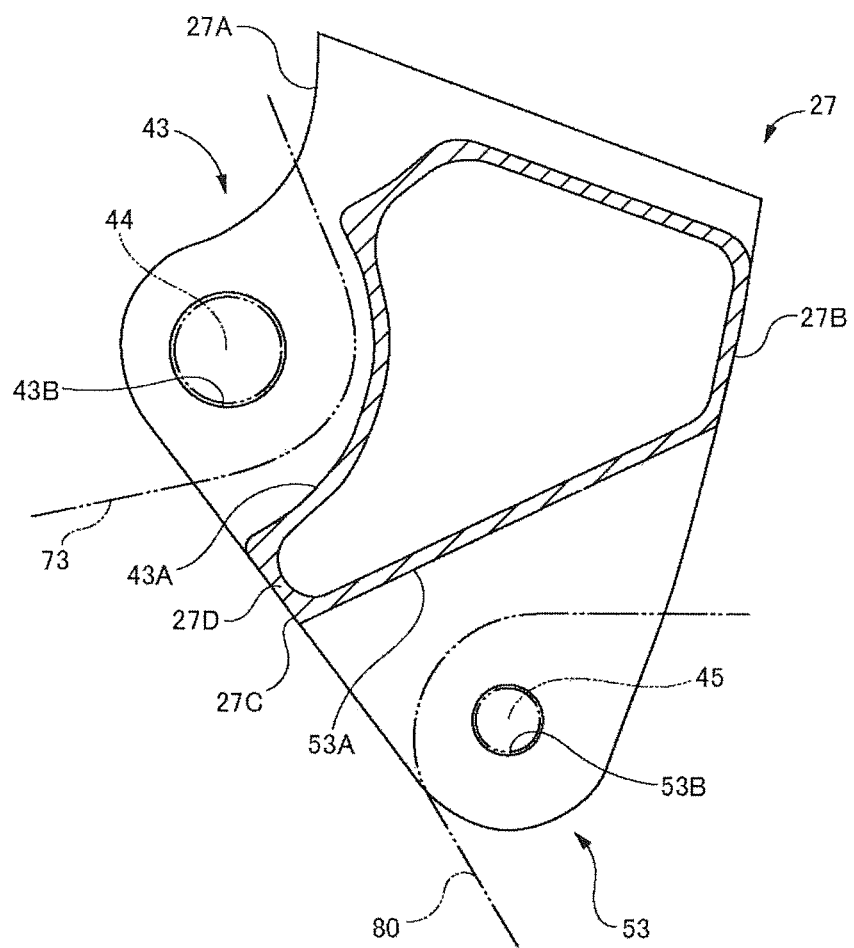
FIG. 11 is a sectional view taken along an arrow XI-XI in FIG. 8, depicting the lower coupling part of the body frame of the vehicle body frame of the illustrative embodiment of the present disclosure.

FIG. 8 depicts the lower coupling part 27 of the body frame 21, as seen from an arrow VIII direction of FIG. 3. FIG. 9 depicts the lower coupling part 27, as seen from an arrow IX direction of FIG. 3. FIG. 10 depicts the lower coupling part 27, as seen from an arrow X direction of FIG. 3. FIG. 11 is a sectional view taken along an arrow XI-XI in FIG. 8, depicting the lower coupling part 27. The rear lower mount part 43 and the link member connecting part 53 are described in detail with reference to FIGS. 8 to 11.

As shown in FIG. 8, the rear lower mount part 43 has a front concave part 43A formed at the front part of the lower coupling part 27 and insertion holes 43B formed in both right and left bracket-shaped portions of the front concave part 43A of the lower coupling part 27. The rear lower mount part 43 is formed integrally with the lower coupling part 27 by casting, for example.

The front concave part 43A is arranged at a central part of the lower coupling part 27 in the right and left direction. Also, the lower coupling part 27 has a substantially rectangular shape (downward-facing trapezoidal shape) of which a lower side is shorter than an upper side, when the lower coupling part 27 is seen from a front upper direction, and the rear lower mount part 43 is formed at a part of the lower coupling part 27 corresponding to the lower side of the rectangular shape. Also, as shown in FIG. 11, the front concave part 43A is formed in a region ranging from a front face 27A to a lower surface 27C of the lower coupling part 27.

As shown in FIG. 8, the insertion holes 43B are formed to penetrate both the right and left bracket-shaped portions of the front concave part 43A of the lower coupling part 27 in the right and left direction. Also, inner openings of the insertion holes 43B in the right and left direction open into the front concave part 43A, respectively, and outer openings in the right and left direction open to left and right surfaces of the lower coupling part 27, respectively.

As shown in FIG. 10, the rear lower mount part 43 is connected with the mounting part 73 provided at the lower side of the rear part of the power unit 64. That is, as shown in FIG. 2, the lower side of the rear part of the power unit 64, specifically, the lower side of the rear part of the transmission case 68 is provided with the mounting part 73 protruding rearward and downward, and the mounting part 73 is formed with the through-hole penetrating the mounting part 73 in the right and left direction. As shown in FIG. 10, the rear lower mount part 43 and the lower side of the rear part of the power unit 64 are connected to each other by arranging the mounting part 73 in the front concave part 43A, inserting a shaft part of a mount bolt 44 into the insertion hole 43B formed in the left bracket-shaped portion of the front concave part 43A, the through-hole formed in the mounting part 73, and the insertion hole 43B formed in the right bracket-shaped portion of the front concave part 43A, and fastening a nut to a leading end-side of the shaft part of the mount bolt 44.

In the meantime, as shown in FIG. 9, the link member connecting part 53 has a rear concave part 53A formed at the rear part of the lower coupling part 27 and insertion holes 53B formed in both right and left bracket-shaped portions of the rear concave part 53A of the lower coupling part 27. The link member connecting part 53 is formed integrally with the lower coupling part 27 by casting, for example.

The rear concave part 53A is arranged at a central part of the lower coupling part 27 in the right and left direction, and is aligned so that a position thereof in the right and left direction coincides with the front concave part 43A of the rear lower mount part 43. Also, the link member connecting part 53 is formed at a part of the lower coupling part 27, which corresponds to a lower side of a substantially rectangular shape, having the rectangular shape of which the lower side is shorter than an upper side, when the straddle-type vehicle 1 is seen from the rear. Also, as shown in FIG. 11, the rear concave part 53A is formed in a region ranging from a rear face 27B to the lower surface 27C of the lower coupling part 27. Also, the front concave part 43A and the rear concave part 53A are close to each other on the lower surface 27C of the lower coupling part 27 but are not coupled to each other. The front concave part 43A and the rear concave part 53A are separated by a wall part 27D formed at a part of the lower end portion of the lower coupling part 27.

As shown in FIG. 9, the insertion holes 53B are formed to penetrate both the right and left bracket-shaped portions of the rear concave part 53A of the lower coupling part 27 in the right and left direction. Also, inner openings of the insertion holes 53B in the right and left direction open into the rear concave part 53A, respectively, and outer openings in the right and left direction open to the left and right surfaces of the lower coupling part 27, respectively.

As shown in FIG. 10, the link member connecting part 53 is connected with the front part of the link member 80. That is, as shown in FIG. 2, the front apex portion of the link member 80 having a triangular plate shape is formed with a through-hole penetrating the corresponding portion in the right and left direction. As shown in FIG. 10, the link member connecting part 53 and the front part of the link member 80 are rotatably connected to each other by arranging the front part of the link member 80 in the rear concave part 53A, inserting a shaft part of a connection bolt 45 into the insertion hole 53B formed in the left bracket-shaped portion of the rear concave part 53A, the through-hole formed in the front part of the link member 80, and the insertion hole 53B formed in the right bracket-shaped portion of the rear concave part 53A, and fastening a nut to a leading end-side of the shaft part of the connection bolt 54.

As described above, according to the vehicle body frame 11 of the illustrative embodiment of the present disclosure, the rear lower mount part 43 is formed at the front part of the lower coupling part 27, and the link member connecting part 53 is formed at the rear part of the lower coupling part 27. Therefore, the link member 80 is connected to the rear part of the lower coupling part 27, and the lower side of the rear part of the power unit 64 is connected to the front part of the lower coupling part 27. Also, the front part of the power unit 64 is connected to the front mount part 41 fixed to the lower end portion of each down frame 15. For this reason, a load that is applied to the link member 80 from the rear or the lower thereof is sequentially transmitted to the lower coupling part 27, the power unit 64, each down frame 15 and the head pipe 12. Thereby, it is possible to receive the load applied to the link member 80 by the lower coupling part 27, the power unit 64, each down frame 15 and the head pipe 12, respectively. That is, it is possible to disperse the load applied to the link member 80 to the lower coupling part 27, the power unit 64, each down frame 15 and the head pipe 12, so that it is possible to suppress the load applied to the link member 80 from being concentrated on the lower coupling part 27. In this way, according to the vehicle body frame 11, it is possible to form the structure for supporting the link member 80 to the vehicle body frame 11 by a structure where the lower coupling part 27, the power unit 64, each down frame 15 and the head pipe 12 are integrated. Thereby, it is possible to increase the stiffness of the structure for supporting the link member 80 to the vehicle body frame 11. Also, the link member 80 is supported by the structure having high stiffness, so that it is possible to accurately transmit the load applied to the swing arm 77 to the rear cushion 79.

Also, since the rear lower mount part 43 and the link member connecting part 53 are respectively formed at the lower coupling part 27, which is a single member, it is possible to smoothly transmit the load applied to the link member 80 to the power unit 64 via the lower coupling part 27.

Also, since the rear lower mount part 43 and the link member connecting part 53 are all arranged at the central part of the lower coupling part 27 in the right and left direction and are close to each other, it is possible to smoothly transmit the load applied to the link member 80 from the link member connecting part 53 to the rear lower mount part 43. Thereby, it is possible to improve the effect of smoothly transmitting the load applied to the link member 80 to the power unit 64 via the lower coupling part 27.

Also, according to the vehicle body frame 11 of the illustrative embodiment, the lower coupling part 27 has the substantially rectangular shape of which a lower side is shorter than a long side, when the lower coupling part 27 is seen from the front upper or the rear, and the rear lower mount part 43 and the link member connecting part 53 are formed at the part of each lower coupling part 27 corresponding to the lower side of the substantially rectangular shape. That is, the lower coupling part 27 has the downward-facing trapezoidal shape of which a width decreases toward the lower, when the lower coupling part 27 is seen from the front upper or the rear. As a result, the left part and the right part of the lower coupling part 27 have a triangular shape, respectively. For this reason, it is possible to increase the stiffness of the lower coupling part 27. Also, the rear lower mount part 43 and the link member connecting part 53 are formed at the lower coupling part 27 having such a shape, so that it is possible to improve the stiffness of the rear lower mount part 43 and the link member connecting part 53.

Also, the rear lower mount part 43 is formed by the front concave part 43A formed at the lower coupling part 27, and the front concave part 43A is formed in the region ranging from the front face 27A to the lower surface 27C of the lower coupling part 27. That is, the front concave part 43A is formed at a part of the lower coupling part 27 corresponding to the lower side of the rectangular shape. As a result, both the right and left bracket-shaped portions of the front concave part 43A have a triangular shape, respectively, when the lower coupling part 27 is seen from the front upper. Therefore, it is possible to increase the stiffness of the rear lower mount part 43.

Also, the link member connecting part 53 is formed by the rear concave part 53A formed at the lower coupling part 27, and the rear concave part 53A is formed in the region ranging from the rear surface 27B to the lower surface 27C of the lower coupling part 27. That is, the rear concave part 53A is formed at a part of the lower coupling part 27 corresponding to the lower side of the rectangular shape. As a result, both the right and left bracket-shaped portions of the rear concave part 53A have a triangular shape, respectively, when the lower coupling part 27 is seen from the rear. Therefore, it is possible to increase the stiffness of the link member connecting part 53.

Also, as shown in FIG. 5, since the lower coupling part 27 has a trapezoidal shape of which a width decreases toward the lower, spaces are formed at left and right sides of the lower part of the body frame 21 of the straddle-type vehicle 1. Thereby, it is possible to improve a degree of layout freedom of components of the straddle-type vehicle 1. For example, the muffler 75 is arranged using the right space of the lower part of the body frame 21 of the straddle-type vehicle 1.

In the meantime, in the illustrative embodiment, the pair of upper tank rails 13 and the pair of lower tank rails 14 are provided. However, the number of tank rails is not limited. Also, in the illustrative embodiment, the pair of down frames 15 is provided with the front mount parts 41, respectively. However, the front mount parts may be directly provided in the front end sides of the tank rails or the head pipe. Also, the vehicle body frame 11 of the illustrative embodiment has a structure close to a diamond frame or a backbone frame. However, the present disclosure can be applied to a single cradle frame or a double cradle frame, as well. Also, the present disclosure can be applied to a twin super frame made by aluminum die-casting, for example. Also, the connecting method of the link member and the rear cushion and the connecting method of the link member and the swing arm are not limited to the connecting methods described in the illustrative embodiment. Also, the present disclosure is not limited to a motorcycle, and can be applied to straddle-type vehicles of other types, such as an automatic three-wheeled vehicle, a four-wheeled buggy car and the like.

Also, in the illustrative embodiment, each down frame 15 is a specific example of "the coupling member" defined in the claims. Also, the left frame part 22 and the right frame part 23 are specific examples of "the pair of side frame parts" defined in the claims. Also, the rear lower mount part 43 is a specific example of "the rear mount part" defined in the claims. Also, the front concave part 43A is a specific example of "the first concave part" defined in the claims, and the rear concave part 53A is a specific example of "the second concave part" defined in the claims.

Also, the present disclosure can be appropriately changed without departing from the gist or spirit of the invention that can be understood from the claims and the specification, and a vehicle body frame of a straddle-type vehicle including the changes is also included in the technical spirit of the present disclosure.

What is claimed is:

1. A vehicle body frame of a straddle-type vehicle, comprising:
    a head pipe provided at a front upper side of a power unit;
    a tank rail extending rearward from the head pipe at an upper side of the power unit;
    a body frame having a pair of side frame parts extending downward from a rear end side of the tank rail at left and right rear sides of the power unit, an upper coupling part configured to couple upper parts of the pair of side frame parts, and a lower coupling part configured to couple lower parts of the pair of side frame parts;
    a front mount part coupled to a front end side of the tank rail or the head pipe directly or via a coupling member, and configured to support a front part of the power unit;
    a rear mount part configured to support a rear part of the power unit;
    swing arm support parts provided in the pair of side frame parts, respectively, and configured to support a front end portion of a swing arm; and
    a link member connecting part for connecting a link member configured to couple the swing arm and a rear cushion each other,
    wherein the rear mount part is formed at a front part of the lower coupling part, and the link member connecting part is formed at a rear part of the lower coupling part, and
    wherein the lower coupling part has a substantially rectangular shape of which a lower side is shorter than a long side, when the straddle-type vehicle is seen from the front or the rear, and the rear mount part and the link member connecting part are formed at a part of the lower coupling part corresponding to the lower side of the substantially rectangular shape.

2. The vehicle body frame according to claim 1, wherein the rear mount part and the link member connecting part are all arranged at a central part of the lower coupling part in a right and left direction.

3. A vehicle body frame of a straddle-type vehicle, comprising:
    a head pipe provided at a front upper side of a power unit;
    a tank rail extending rearward from the head pipe at an upper side of the power unit;
    a body frame having a pair of side frame parts extending downward from a rear end side of the tank rail at left and right rear sides of the power unit, an upper coupling part configured to couple upper parts of the pair of side frame parts, and a lower coupling part configured to couple lower parts of the pair of side frame parts;
    a front mount part coupled to a front end side of the tank rail or the head pipe directly or via a coupling member, and configured to support a front part of the power unit;
    a rear mount part configured to support a rear part of the power unit;
    swing arm support parts provided in the pair of side frame parts, respectively, and configured to support a front end portion of a swing arm; and
    a link member connecting part for connecting a link member configured to couple the swing arm and a rear cushion each other,
    wherein the rear mount part is formed at a front part of the lower coupling part, and the link member connecting part is formed at a rear part of the lower coupling part, and
    wherein the rear mount part has a first concave part for inserting therein a mounting part provided in the power unit, the first concave part is formed on a front face or lower surface of the lower coupling part, the link member connecting part has a second concave part for inserting therein a part of the link member, and the second concave part is formed on a rear surface or lower surface of the lower coupling part.

* * * * *